US012679199B2

(12) United States Patent (10) Patent No.: US 12,679,199 B2
Oszwald et al. (45) Date of Patent: Jul. 14, 2026

(54) INTERNAL REINFORCEMENT ELEMENT FOR A TANK MADE OF PLASTIC FOR A MOTOR VEHICLE

(71) Applicant: PLASTIC OMNIUM ADVANCED INNOVATION AND RESEARCH, Brussels (BE)

(72) Inventors: Pierre Oszwald, Brussels (BE); Thomas Peret, Brussels (BE); Antoine Guegan, Brussels (BE); Dominique Madoux, Brussels (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 18/855,392

(22) PCT Filed: Apr. 18, 2023

(86) PCT No.: PCT/EP2023/060030
§ 371 (c)(1),
(2) Date: Oct. 9, 2024

(87) PCT Pub. No.: WO2023/203030
PCT Pub. Date: Oct. 26, 2023

(65) Prior Publication Data
US 2026/0014849 A1 Jan. 15, 2026

(30) Foreign Application Priority Data
Apr. 19, 2022 (BE) .................................. 2022/5285

(51) Int. Cl.
*B60K 15/03* (2006.01)

(52) U.S. Cl.
CPC ................... *B60K 15/03177* (2013.01); *B60K 2015/03032* (2013.01); *B60K 2015/0346* (2013.01); *B60K 2015/03493* (2013.01)

(58) Field of Classification Search
CPC .......... B06K 2015/03328; B06K 15/03; B06K 2015/03493; B06K 2015/0346; B06K 2015/03032; B06K 15/03117
(Continued)

(56) References Cited

U.S. PATENT DOCUMENTS 6,135,306 A * 10/2000 Clayton ........... B60K 15/03177
220/653
6,223,929 B1 5/2001 Gerhard
(Continued)

FOREIGN PATENT DOCUMENTS

CN 113246718 A 8/2021
CN 113492674 A 10/2021
(Continued)

OTHER PUBLICATIONS

International Search Report issued Jun. 9, 2023 in PCT/EP2023/060030, filed Apr. 18, 2023, 2 pages.

*Primary Examiner* — Chun Hoi Cheung
(74) *Attorney, Agent, or Firm* — Oblon, McClelland, Maier & Neustadt, L.L.P.

(57) ABSTRACT

An internal reinforcement element for a tank made of plastic for a motor vehicle includes: a central structure including a first system of ribs including at least three primary ribs joined to one another and a second system of ribs including at least two secondary ribs. The sides of the primary ribs opposite the sides form a joint and the sides of the secondary ribs opposite the sides joining the primary rib define a projected surface from the central structure having a first peripheral geometric shape. A first end and a second end located on both sides of the central structure include a weld (Continued)

region, the first end and the second end having a second peripheral geometric shape forming a transition between the first peripheral geometric shape and a third peripheral geometric shape.

16 Claims, 2 Drawing Sheets

(58) Field of Classification Search
USPC .............................. 206/4.14, 564, 581, 565
See application file for complete search history.

(56) References Cited

U.S. PATENT DOCUMENTS

| | | | | |
|---|---|---|---|---|
| 6,338,420 | B1 * | 1/2002 | Pachciarz | ........ B60K 15/03177 |
| | | | | 220/4.13 |
| 8,490,807 | B2 * | 7/2013 | Varga | ............... B60K 15/03177 |
| | | | | 220/682 |
| 8,783,287 | B2 * | 7/2014 | Matusek | ................ B60K 15/03 |
| | | | | 137/565.34 |
| 9,731,866 | B2 * | 8/2017 | Quant | .................... B65D 51/16 |
| 9,783,044 | B2 * | 10/2017 | Gebert | ............ B60K 15/03177 |
| 11,235,658 | B2 * | 2/2022 | Ryu | ........................ B60K 15/03 |
| 11,427,077 | B2 * | 8/2022 | Kye | ..................... B60K 15/077 |
| 12,172,514 | B2 * | 12/2024 | Nakaya | .................. B60K 15/03 |
| 2002/0066737 | A1 | 6/2002 | Stack et al. | |
| 2015/0014307 | A1 * | 1/2015 | Pozgainer | ........... B65D 23/001 |
| | | | | 156/60 |
| 2018/0065475 | A1 * | 3/2018 | Amano | ................ B60K 15/03 |
| 2020/0189384 | A1 * | 6/2020 | Lichti | ............. B60K 15/03177 |

FOREIGN PATENT DOCUMENTS

| | | |
|---|---|---|
| DE | 299 11 640 U1 | 11/2000 |
| JP | 2016-128277 A | 7/2016 |
| WO | WO 2006/008308 A1 | 1/2006 |
| WO | WO 2006/095024 A1 | 9/2006 |
| WO | WO 2007/000454 A1 | 1/2007 |
| WO | WO 2012/139962 A1 | 10/2012 |

* cited by examiner

INTERNAL REINFORCEMENT ELEMENT FOR A TANK MADE OF PLASTIC FOR A MOTOR VEHICLE

BACKGROUND OF THE INVENTION

Field of the Invention

The invention relates to an internal reinforcement element for a tank made of plastic for a motor vehicle. More particularly, the invention also relates to a plastic tank for a motor vehicle comprising an internal reinforcement element and a method of manufacturing a plastic tank for a motor vehicle.

The invention can be used in particular in plastic fuel tanks for hybrid motor vehicles.

Description of the Related Art

Traditionally, motor vehicle fuel tanks are designed to hold a quantity of fuel at a pressure almost identical to atmospheric pressure. With the advent of hybrid vehicles, also known as HEV (Hybrid Electric Vehicle), MHEV (Mild-Hybrid Electric Vehicle) or PHEV (Plug-in Hybrid Electric Vehicle), in other words motor vehicles comprising an internal combustion engine and one or more electric motors, which can potentially run for several months without using the internal combustion engine, it is preferable to maintain pressure in the fuel tank to reduce the passage of fuel vapors through an activated carbon filter, also known as a canister. This is achieved by isolating the canister from the tank using a valve such as a Fuel Tank Isolation Valve (FTIV).

Such plastic fuel tanks therefore undergo dimensional variations over their life, which can occur initially as soon as they exit the mold as a result of cooling thereof which is accompanied by shrinkage of the material, said plastic tanks being obtained by extrusion blow-molding a parison, or during use thereof as a result in particular of positive or negative pressure of their contents, or as a result of thermal expansion thereof over their life, or as a result of aging thereof.

Typically, plastic fuel tanks for motor vehicles, more particularly plastic fuel tanks for hybrid motor vehicles also known as HEV (Hybrid Electric Vehicle), MHEV (Mild-Hybrid Electric Vehicle) or PHEV (Plug-in Hybrid Electric Vehicle), comprise an internal reinforcement element in the form of a pillar joining two opposing internal surfaces of the tank. Such a pillar must withstand various tests, such as long-term aging or a handling drop from a height of 1 meter, without degrading the properties of the fuel tank. For example, document WO2012/139962 A1 discloses a "diabolo" type circular pillar that is highly resistant to axial stress due to tension/compression phenomena, as well as to aging and strength tests. However, such a pillar is highly sensitive to stress caused by bending and/or torsion.

Also known from US2002/0066737 is a fuel tank whose upper and lower shells are connected by a honeycomb-shaped reinforcing structure. To perform its reinforcing function, such a structure extends substantially over the entire inner surface of the bottom and top walls of the tank. As a result, it is a cumbersome reinforcement system and cannot be used for tanks of different shapes.

BRIEF SUMMARY OF THE INVENTION

The invention aims in particular to overcome these disadvantages of the prior art.

More precisely, one of the objectives of the invention, in at least one of its embodiments, is to provide a reinforcement element for a plastic tank for a motor vehicle that can withstand not only axial stress due to tension/compression phenomena, but also bending and torsion phenomena, said internal reinforcement element being easily obtained by injection molding.

A further objective of the invention, in at least one embodiment, is to provide a plastic fuel tank for a motor vehicle comprising an internal reinforcement element.

In at least one of its embodiments, the invention also aims to implement a method for manufacturing a plastic fuel tank for a motor vehicle comprising an internal reinforcement element.

In accordance with one particular embodiment, the invention relates to an internal reinforcement element for a plastic tank for a motor vehicle, According to the invention, such an internal reinforcement element comprises:

a central structure comprising:
a first system of ribs, called the primary system of ribs, comprising at least three primary ribs joined to one another, each primary rib having two opposite faces, called faces, and being joined to the other primary ribs by a single side, the central structure having a joint with the at least three primary ribs at its center, said joint and said primary ribs extending along an axis E,
a second system of ribs, called the secondary system of ribs, comprising at least two secondary ribs, said at least two secondary ribs being located on both sides of a primary rib and being joined on one side to the faces of the primary rib, so as to separate each face of the primary rib into two face portions, said at least two secondary ribs extending along an axis parallel to the axis E, each secondary rib forming an angle greater than 0° with the primary rib to which it is joined,
the sides of the primary ribs opposite the joint-forming sides and the sides of the secondary ribs opposite the sides joined to the faces of the primary rib defining a projected surface of the central structure having a first peripheral geometric shape along the axis E,
a first end and a second end located on both sides of the central structure, each comprising the first system of ribs and the second system of ribs, the first end and the second end comprising a weld region configured to be welded to the plastic tank, the first end and the second end having a second peripheral geometric shape forming a transition between the first peripheral geometric shape and a third peripheral geometric shape of the weld region, the second geometric shape and the third geometric shape corresponding to the respective geometric shapes of the surfaces projected along the axis E.

The general principle of the invention is based on the presence of a central structure comprising a double system of ribs consisting of a first system of ribs, called the primary system of ribs, comprising at least three primary ribs joined to one another, and a second system of ribs, called the secondary system of ribs, comprising at least two secondary ribs located on both sides of a primary rib and being joined on one side to the respective faces of the primary rib so as to separate each face of the primary rib into two face portions; the double system of ribs extending into a first end and a second end located on both sides of the central structure, the first end and the second end comprising a weld region configured to be welded to the plastic tank, the first end and the second end having a second peripheral geometric shape forming a transition between the first peripheral geometric shape and a third peripheral geometric shape of the weld region, the second geometric shape and the third geometric shape corresponding to the respective geometric shapes of the surfaces projected along an axis E corresponding to the junction of the primary ribs. The weld regions on the first and second ends enable two opposing inner surfaces of the container to be connected via the internal reinforcement element by welding the internal reinforcement element to the inner walls.

Thus, the invention is based on a completely new and inventive approach to an internal reinforcement element resulting from the presence of a double system of ribs enabling, through their arrangement within the reinforcement element both in the central structure and in the first and second ends, provision of an internal reinforcement element that is able to withstand not only axial stress, in particular compression forces exerted in directions parallel to the axis E, but also bending and torsion phenomena, while at the same time being easily injectable. Indeed, the first system of ribs provides a set of primary ribs extending in directions parallel to the axis E, extending in at least two distinct directions. These primary ribs can therefore effectively withstand stress in the direction of the axis E. In addition to this effective resistance in the axial direction, the secondary ribs extending from the faces of the primary ribs (so as to separate each face of the primary ribs into two face portions) add a particularly effective resistance to torsional or bending forces that could occur in directions orthogonal to the axis E. In fact, the secondary ribs make it possible to work in torsion or flexion in directions in addition to the directions of the primary ribs, along at least one direction secant to the direction of the primary rib to which they are joined. Thus, any force tending to create a turning moment on the internal reinforcement element or to bend the internal reinforcement element in a plane orthogonal to the axis E, due in particular to shearing of the tank between its two weld regions, is more easily transmitted to one side of a primary rib or to one side of a secondary rib, thus counteracting the bending or twisting force of the internal reinforcement element. Such a structure is more effective at counteracting any force tending to create a turning moment on the internal reinforcement element, or bending the internal reinforcement element, than a honeycomb structure. Additionally, as the secondary ribs intersect the faces of the primary ribs, the joints between them are different from those of the primary ribs, so that the forces are not transmitted solely to the joints of the primary ribs and are therefore more evenly distributed over the internal reinforcement element. The secondary ribs thus enable the entire internal reinforcement element to be put to use, transferring the stresses to the entire internal reinforcement element. They further prevent buckling of the primary ribs. In addition, compared with a honeycomb structure, the internal reinforcement element can be more compact and can be adapted to any type of tank.

The expression "the sides of the primary ribs opposite the joint-forming sides and the sides of the secondary ribs opposite the sides joined to the faces of the primary rib defining a projected surface of the central structure having a first peripheral geometric shape along the axis E" is understood to mean that the projected surface along the axis E is defined by the imaginary junction of the sides of the primary ribs opposite the joint-forming sides and the sides of the secondary ribs opposite the sides joined to the faces of the primary rib.

The expression "the first end and the second end having a second peripheral geometric shape forming a transition between the first peripheral geometric shape and a third peripheral geometric shape of the weld region" is understood to mean that the second peripheral geometric shape evolves gradually from the first geometric shape to the third geometric shape.

The "face" of a rib refers to a large surface of the rib, adjacent to a small surface called the "side" of the rib.

The expression "each secondary rib forming an angle greater than 0° with the primary rib to which it is joined" is understood to mean that the secondary rib is secant to the primary rib. In other words, the secondary rib extends in a plane which is not parallel to the plane of the primary rib.

The internal reinforcement element has a central axis connecting the first, second and third geometric shapes. This central axis passes through the center of the central structure, and the centers of the first, second and third geometric shapes. The central axis coincides with the axis E. If necessary, the central axis is an axis of symmetry of the internal reinforcement element. According to one embodiment, the central axis is a longitudinal axis of the internal reinforcement element.

According to one embodiment, in the first and second ends, the primary and secondary ribs each extend in a plane that is not parallel to the axis E, so as to narrow toward the weld region.

According to one embodiment, the sides of the primary ribs opposite the joining sides and the sides of the secondary ribs opposite the sides joining the faces of the primary rib are not engaged with another first system of ribs and another second system of ribs.

According to one embodiment, the central structure extends along the axis E for a length at least equal to the length along the axis E of each of the first and second ends.

Advantageously, the internal reinforcement element for a motor vehicle plastic tank according to the invention is such that the first system of ribs, called the primary system of ribs, comprises at least four primary ribs joined to one another, each primary rib being joined to the other primary ribs by only one side.

Thus, at least four primary ribs joined to one another provide an easily injectable internal reinforcement element with increased resistance to axial stress, as well as to bending and torsion. The internal reinforcement element according to the invention can therefore advantageously comprise four primary ribs joined to one another, whereas in the state of the art, a structure of four ribs joined together is generally avoided as it is associated with shrinkage phenomena, that is, excess thicknesses in the tank wall.

According to a preferential embodiment, the internal reinforcement element for a motor vehicle plastic tank according to the invention is such that the angle formed by two adjacent primary ribs of the first primary system of ribs is identical for all adjacent primary ribs. For example, in the case of a first system of ribs, called the primary system of ribs, comprising 3 primary ribs, each primary rib being joined to the other primary ribs by a single side, in such a system the angle formed by two adjacent primary ribs is therefore equal to 120°. For a first system of ribs, called a primary system of ribs, comprising 4 primary ribs, the angle formed by two adjacent primary ribs is therefore equal to 90°.

Thus, an internal reinforcement element comprising a first system of ribs, called the primary system of ribs, such that all adjacent primary ribs form the same angle, has homogeneous resistance to axial stress, but also to bending and torsion phenomena and an even distribution of mechanical stresses.

According to a preferential embodiment, the internal reinforcement element for a motor vehicle plastic tank according to the invention is such that the primary rib constitutes a plane of symmetry for the at least two secondary ribs adjoining it and located on both sides of said primary rib. In other words, the plane of the primary rib constitutes a plane of orthogonal symmetry of the two secondary ribs that adjoin said primary rib. Preferentially, each primary rib of the internal reinforcement element is joined to at least two secondary ribs and constitutes a plane of symmetry for the at least two secondary ribs which are joined to it on one side at the faces of the primary rib and which are located on both sides of said primary rib.

The angle formed by the primary and secondary ribs is preferentially at most 45°. More preferentially, this angle is equal to 45° when the angle between the primary ribs is equal to 90°.

Thus, an internal reinforcement element comprising a primary rib constituting a plane of symmetry for the at least two secondary ribs adjoining it and located on both sides of said primary rib has a homogeneous resistance to mechanical stress.

According to a preferential embodiment, the internal reinforcement element for a motor vehicle plastic tank according to the invention is such that at least one primary rib of the first primary system of ribs comprises a side opposite the joint in the form of a two-pronged fork.

Thus, an internal reinforcement element comprising at least one primary rib of the first primary system of ribs comprising a side opposite the joint in two-pronged fork form has improved homogeneous resistance to mechanical stress, owing in particular to an improved transition region and better resistance of the welded region to mechanical stress. Preferentially, all the primary ribs of the first primary system of ribs comprise a side opposite the joint in the form of a two-pronged fork.

As an alternative to, or in combination with, the preceding embodiment, the internal reinforcement element for a motor vehicle plastic tank according to the invention is such that at least one primary rib of the first primary system of ribs comprises a side opposite the joint in the form of a cross.

The expression "in the form of a cross" is understood to mean that the primary rib has a curved end, such as an ice hockey stick shape or a field hockey stick shape.

According to a preferential embodiment, the internal reinforcement element for a motor vehicle plastic tank according to the invention is such that the first peripheral geometric shape of the central structure and the third peripheral geometric shape of the weld region corresponding to the respective geometric shapes of the surfaces projected along the axis E are such that the surface area of the projected surface of the third peripheral geometric shape is less than the surface area of the projected surface of the first peripheral geometric shape. Preferentially, the ratio between the projected surface area of the first peripheral geometric shape and the projected surface area of the third peripheral geometric shape is at least 1.5, preferentially at least 2.

According to a preferential embodiment, the internal reinforcement element for a motor vehicle plastic tank according to the invention is such that the first peripheral geometric shape of the surface projected along the axis E of the central structure is a polygon, preferentially a regular polygon, preferably a square. In the case of a non-regular polygon, a parallelepiped is a preferred shape, preferably a rectangle.

According to a preferential embodiment, the internal reinforcement element for a motor vehicle plastic tank according to the invention is such that the third peripheral geometric shape is inscribed in the first peripheral geometric shape.

According to a preferential embodiment, the internal reinforcement element for a motor vehicle plastic tank according to the invention is such that the third peripheral geometric shape of the surface projected along the axis E of a weld region is a circle. A connection interface with the circular tank wall ensures better stress distribution. Preferentially, the first peripheral geometric shape of the central structure is rectangular, that is, a rectangle, and the third peripheral geometric shape of the weld region is circular, that is, a circle.

According to a preferential embodiment, the internal reinforcement element for a motor vehicle plastic tank according to the invention is such that it comprises gripping means in the form of a clipping region configured to be attached to a support or in the form of gripping ribs.

Thus, the presence of a gripping means enables the internal reinforcement element to be inserted into the tank during manufacture.

According to a preferential embodiment, the internal reinforcement element for a motor vehicle plastic tank according to the invention is such that the angle formed by two adjacent primary ribs is approximately equal to 90°.

According to a preferential embodiment, the internal reinforcement element for a motor vehicle plastic tank according to the invention is such that the angle formed by a primary rib and a secondary rib is approximately equal to 45°.

Preferentially, the internal reinforcement element comprises four primary ribs, the primary ribs taken in pairs forming a 90° angle. The internal reinforcement element comprises two secondary ribs on each primary rib. These two secondary ribs are located on both sides of the primary rib to which they are joined on one side to the faces of the primary rib, said at least two secondary ribs extending along the axis E, each secondary rib forming a 45° angle with the primary rib to which it is joined.

According to a preferential embodiment, the internal reinforcement element for a motor vehicle plastic tank according to the invention is such that the thickness of the primary ribs is at least 1.25 times greater than the thickness of the secondary ribs.

According to a preferential embodiment, the internal reinforcement element for a motor vehicle plastic tank according to the invention is such that the central structure, the first end and the second end constitute a one-piece assembly.

Thus, a one-piece assembly makes it easier to manufacture the reinforcement element and provides better resistance to mechanical stress. The reinforcement element is easier to manufacture, as it is based on a single injection stage with no "post-injection" assembly operations.

According to a preferential embodiment, the internal reinforcement element for a motor vehicle plastic tank according to the invention is such that it is based on a material selected from polyoxymethylene (POM), polyphenylene sulfide (PPS), polyphthalimide (PPA), polyetheretherketone (PEEK), polyamide-imide (PAI), polyaryletherketone (PAEK), polyamide (PA), polyketone (PK) and polyethylene (PE), preferentially polyethylene (PE), more preferentially high-density polyethylene (HDPE). Advantageously, the material constituting the internal reinforcement element comprises fibers, such as glass fibers, carbon fibers, polymer fibers (such as a polyamide, for example an aromatic polyamide such as aramid), or natural fibers such as hemp or sisal. Preferably, it is fiberglass (E-glass, S-glass or other glass). The fiber-containing material is thus a reinforced composite material. The fiber content is less than 20%, preferentially less than 15%, more preferentially less than 10%. The expression "fiber content less than 20%, preferentially less than 15%, more preferentially less than 10%" is understood to mean a fiber content of less than 20%, preferentially less than 15%, more preferentially less than 10% by volume or weight, preferentially a fiber content by volume.

According to a preferential embodiment, the internal reinforcement element for a motor vehicle plastic tank according to the invention is such that the axis E is a central axis of symmetry of the first system of ribs, called the primary system of ribs, of said internal reinforcement element. Preferentially, the axis E is also an axis of symmetry of the second system of ribs, called the secondary system of ribs, of said internal reinforcement element.

Thus, an internal reinforcement element such that the axis E is a central axis of symmetry of the first system of ribs, called the primary system of ribs, of said internal reinforcement element, and preferentially of the second system of ribs, called the secondary system of ribs, of said internal reinforcement element, makes it possible to exhibit equal mechanical strength in all directions of stress.

According to a preferential embodiment, the internal reinforcement element for a motor vehicle plastic tank according to the invention is such that the weld region of the first end and the second end configured to be welded to the plastic tank comprises weld studs and/or weld ribs.

The invention also relates to a plastic tank for a motor vehicle comprising an internal reinforcement element according to the invention.

The invention also relates to a method for manufacturing a plastic tank for a vehicle tank. Said method for manufacturing a plastic tank for a vehicle tank comprises the following steps:

1. Extruding a parison,
2. Inserting an internal reinforcement element according to the invention within the parison before or after blow-molding,
3. Welding the internal reinforcement to the tank wall.

According to an advantageous implementation, the method for manufacturing a plastic tank for an automobile tank according to the invention is such that the reinforcement element is inserted into the parison is before the tank is blown. Preferentially, the parison has a tubular shape, the internal reinforcement element being inserted into the tubular parison, preferentially after a step of spreading the bottom of the tubular parison. This step of spreading the bottom of the parison is preferentially followed by a pre-blowing step. Advantageously, in the case of insertion of the internal reinforcement element into a tubular-shaped parison, said internal reinforcement element is provided with gripping means in the form of a clipping region configured to be attached to a support. This allows the internal reinforcement element to be attached to a support, which support may comprise other components such as a baffle, a valve, a ventilation or fuel line, a sensor, which sensor may be a quality sensor and/or a level sensor.

The expression "tank blowing" is understood to refer to the fact that the parison is shaped into a tank by blowing into a mold.

According to an advantageous alternative implementation to the preceding mode, the method for manufacturing a plastic tank for an automobile tank according to the invention is such that the internal reinforcement element is inserted into the parison is after the tank is blown. Preferentially, the parison is in the form of two strips at the outlet of the extrusion system. The internal reinforcement element is inserted into the already blown parison when the mold is reopened prior to final blowing. The internal reinforcement element is inserted using a robot arm and/or a central core. Advantageously, in the case of insertion of the internal reinforcement element into a parison in the form of two strips exiting an extrusion system, said internal reinforcement element is provided with gripping means in the form of gripping ribs. The gripping ribs enable the internal reinforcement element to be attached and positioned on a robot arm and/or a central core prior to attachment inside the tank. The expression "central core" is understood to refer to a central part configured to be inserted between two half-shells of a mold during the method for manufacturing a plastic tank, said core being disclosed for example in documents WO2007000454 A1, WO2006095024 A1 or WO 2006008308 A1.

BRIEF DESCRIPTION OF THE SEVERAL VIEWS OF THE DRAWINGS

Other features and advantages of the invention will become more clearly apparent on reading the following description of a preferred embodiment, given by way of simple, illustrative and non-limiting example, and from the appended drawings, among which.

DETAILED DESCRIPTION OF THE INVENTION

Figures 1, 2:
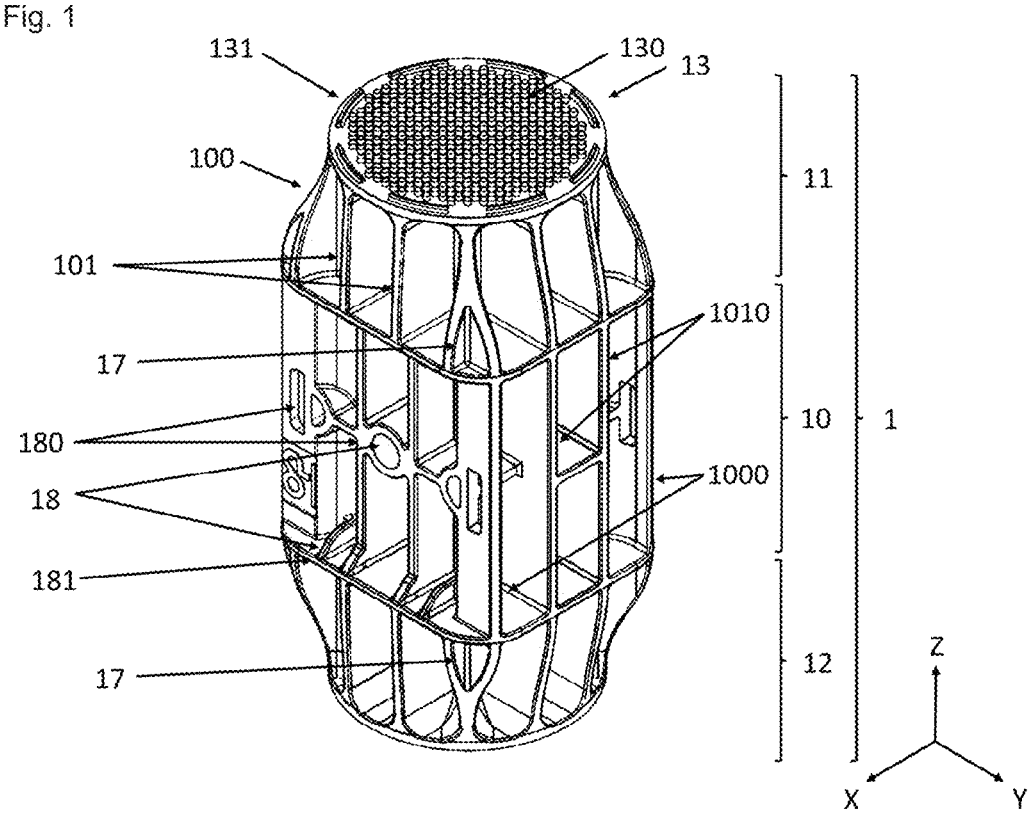
FIG. 1 shows an internal reinforcement element in a three-quarter elevated view.
FIG. 2 shows a longitudinal section of an internal reinforcement element.

Referring to [FIG. 1], an embodiment of the internal reinforcement element according to the invention is presented. The internal reinforcement element 1 extends vertically along an axis Z and horizontally in the plane (X, Y), so as to form an orthogonal reference frame (X, Y, Z). The internal reinforcement element 1 comprises a central structure 10 comprising:

A first system of ribs 100, called primary system of ribs 100, comprising four primary ribs 1000 joined to one another, each primary rib 1000 having two opposite faces 1000f, called faces 1000f, and being joined to the other primary ribs 1000 by only one side, the central structure 100 having a joint of the four primary ribs 1000 at its center, said joint 14 and said primary ribs 1000 extending along an axis E referenced 15, parallel to the axis Z, a second system of ribs 101, called secondary system of ribs 101, comprising at least two secondary ribs 1010, said at least two secondary ribs 1010 being located on both sides of the primary ribs 1000 and being joined on one side to the faces 1000f of the primary rib 1000, so as to separate each face 1000f of the primary rib into two face portions 1000f1, 1000f2, said at least two secondary ribs 1010 extending along an axis parallel to the axis E, each secondary rib 1010 forming an angle equal to 45° with the primary rib 1000 to which it is joined, the sides of the primary ribs 1000 opposite the joint-forming sides and the sides of the secondary ribs 1010 opposite the sides joined to the faces 1000*f* of the primary rib 1000 defining a projected surface of the central structure 10 having a first peripheral geometric shape 16 along the axis E, a first end 11 and a second end 12 located on both sides of the central structure 10, each comprising the first system of ribs 100 and the second system of ribs 101, the first end 11 and the second end 12 comprising a weld region 13 configured to be welded to the plastic tank, the first end 11 and the second end 12 having a second peripheral geometric shape 16' forming a transition between the first peripheral geometric shape 16 and a third peripheral geometric shape of the weld region 13, the second geometric shape 16' and the third geometric shape corresponding to the respective geometric shapes of the surfaces projected along the axis E.

The first 16, second 16' and third peripheral geometric shapes each extend in a plane parallel to the plane (X, Y). The internal reinforcement element 1 withstands axial stress in directions parallel to the axis Z, as well as bending and torsional forces. The first system of ribs 100 provides a set of primary ribs 1000 extending in directions parallel to the axis E, that is, in planes parallel to the axis E. The primary ribs 1000 can therefore work in compression in the direction of the axis E, as well as in torsion in a direction orthogonal to the axis E and facing the side of the primary rib 1000. The secondary ribs 1010, joined to the faces 1000*f* of a primary rib 1000 and also extending in planes parallel to the axis E, enable torsional working, in at least one direction secant to the direction of the primary rib 1000 to which they are joined, most particularly in a direction orthogonal to the axis E and facing the side of the secondary rib 1010.

The internal reinforcement element shown in [FIG. 1] comprises a third peripheral geometric shape of the projected surface along the axis E of a circular weld region 13 and a first peripheral geometric shape of the rectangular central structure 10. The first peripheral geometric shape 16 of the central structure 10 and the third peripheral geometric shape of the weld region 13 corresponding to the respective geometric shapes of the surfaces projected along the axis E are such that the surface area of the projected surface of the third peripheral geometric shape is less than the surface area of the projected surface of the first peripheral geometric shape 16. Preferentially, the ratio between the projected surface area of the first peripheral geometric shape 16 and the projected surface area of the third peripheral geometric shape is at least 1.5, preferentially at least 2. The weld region 13 of the first end 11 and second end 12 configured to be welded to the plastic tank comprises weld studs 130 and weld ribs 131. The internal reinforcement element 1 also comprises a gripping means 18 in the form of a clipping region 180 configured for attachment to a support or in the form of gripping ribs 181. Primary ribs 1000 of the first primary system of ribs 100 comprise a side opposite the two-pronged fork joint 17. The internal reinforcement element 1 is based on high-density polyethylene, with the central structure 10, the first end 11 and the second end 12 located on both sides of the central structure 10 forming a one-piece unit.

The internal reinforcement element 1 has a central axis connecting the first 16, second 16' and third geometric shapes. This central axis passes through the center of the central structure 10, and the centers of the first 16, second 16' and third geometric shapes. The central axis merges with the axis E.

In the embodiment shown, the central axis is an axis of symmetry of the internal reinforcement element 1, and the central axis is a longitudinal axis of the internal reinforcement element. In the first 11 and second 12 ends, the primary 1000 and secondary 1010 ribs each extend in a plane that is not parallel to the axis E, so as to narrow to the weld region 13.

In the embodiment shown, the central structure 10 extends along the axis E for a length at least equal to the length along the axis E of each of the first 11 and second 12 ends. More precisely, the length of the central structure 10 is greater than the length of each of the first 11 and second 12 ends.

FIG. 2 shows a longitudinal section of the internal reinforcement element 1 shown in [FIG. 1]. The internal reinforcement element 1 comprises a central structure 10 comprising:

a first system of ribs 100, called primary system of ribs 100, comprising four primary ribs 1000 joined to one another, each primary rib 1000 being joined to the other primary ribs 1000 by only one side, the central structure 100 having a joint of the four primary ribs 1000 at its center, said joint and said primary ribs 1000 extending along an axis E 15, a second system of ribs 101, called secondary system of ribs 101, comprising at least two secondary ribs 1010, said at least two secondary ribs 1010 being located on both sides of the primary ribs 1000 and being joined on one side to the faces of the primary rib 1000, so as to separate each face 1000*f* of the primary rib 1000 into two face portions 1000*f1*, 1000*f2*, said at least two secondary ribs 1010 extending along an axis parallel to the axis E 15, the sides of the primary ribs 1000 opposite the joint-forming sides and the sides of the secondary ribs 1010 opposite the sides joined to the faces of the primary rib 1000 defining a projected surface of the central structure having a first peripheral geometric shape along the axis E 15, a first end 11 and a second end 12 located on both sides of the central structure 10, each comprising the first system of ribs 100 and the second system of ribs 101, the first end 11 and the second end 12 comprising a weld region 13 configured to be welded to the plastic tank, the first end 11 and the second end 12 having a second peripheral geometric shape forming a transition between the first peripheral geometric shape and a third peripheral geometric shape of the weld region 13, the second geometric shape and the third geometric shape corresponding to the respective geometric shapes of the surfaces projected along the axis E 15.

The internal reinforcement element shown in [FIG. 2] comprises a third peripheral geometric shape of the projected surface along the axis E 15 of a circular weld region 13. The internal reinforcement element 1 also comprises a gripping means 18 in the form of a clipping region 180 configured for attachment to a support or in the form of gripping ribs 181. Primary ribs 1000 of the first primary system of ribs 100 comprise a side opposite the two-pronged fork joint 17.

Figure 3:
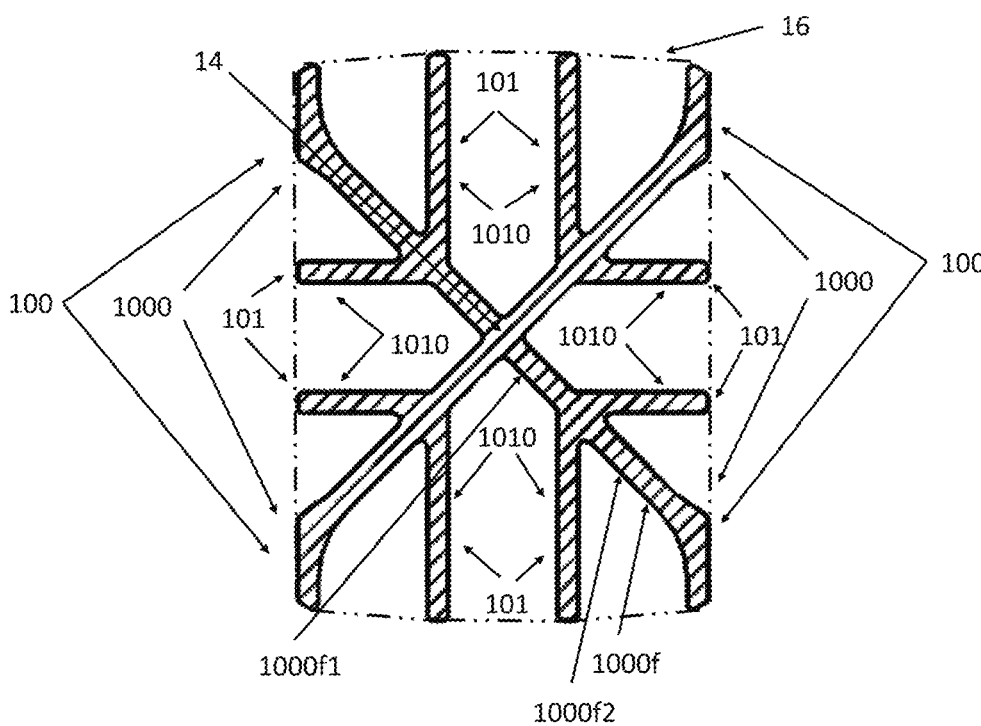
FIG. 3 shows a first cross section of an internal reinforcement element.

FIG. 3 shows a first cross section, in a plane parallel to the plane (X, Y), of the central structure 10 of the internal reinforcement element 1. The cross section is made along a plane as depicted in [FIG. 2] by the dotted line referenced A. The central structure 10 comprises a first system of ribs 100, called the primary system of ribs 100, comprising four primary ribs 1000 joined to one another, each primary rib 1000 joined to one another, each primary rib 1000 being joined to the other primary ribs 1000 by only one side, the central structure 100 having a joint 14 of the four primary ribs 1000 at its center. The primary ribs 1000 of the first primary system of ribs 100 comprise a side opposite the cross-shaped joint 14. The angle formed by two adjacent primary ribs 1000 is approximately 90°. The central structure 10 comprises a second system of ribs 101, called the secondary system of ribs 101, comprising eight secondary ribs 1010. Two secondary ribs 1010 are respectively located on both sides of a primary rib 1000 and are joined on one side to the faces 1000*f* of the primary rib 1000, so as to separate each face 1000*f* of the primary rib into two face portions 1000*f*1, 1000*f*2, each secondary rib 1010 forming an angle equal to 45° with the primary rib 1000 to which it is joined. Note that the first peripheral geometric shape 16 of the surface projected along the axis E (not shown because orthogonal) of the central structure 10 is a polygon.

In the embodiment depicted, the sides of the primary ribs 1000 opposite the joint-forming sides 14 and the sides of the secondary ribs 1010 opposite the sides joining the faces 1000*f* of the primary rib 1000 are not engaged with another first system of ribs 100 and another second system of ribs 101.

Figure 4:
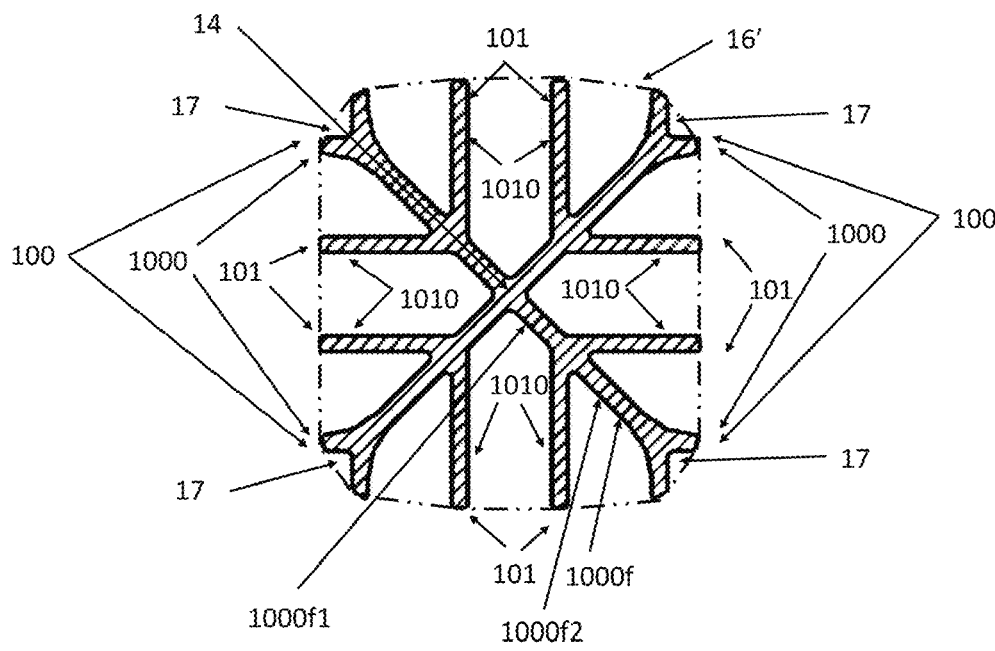
FIG. 4 shows a second cross section of an internal reinforcement element.

FIG. 4 shows a second cross section, in a plane parallel to the plane (X, Y), of the central structure 10 of the internal reinforcement element 1. The cross section is made along a plane as depicted in [FIG. 2] by the dotted line referenced B. The central structure 10 comprises a first system of ribs 100, called the primary system of ribs 100, comprising four primary ribs 1000 joined to one another, each primary rib 1000 being joined to the other primary ribs 1000 by only one side, the central structure 100 having a joint 14 of the four primary ribs 1000 at its center. The primary ribs 1000 of the first primary system of ribs 100 comprise a side opposite the joint 14 in the form of a two-pronged fork 17. The angle formed by two adjacent primary ribs 1000 is approximately 90°. The central structure 10 comprises a second system of ribs 101, called the secondary system of ribs 101, comprising eight secondary ribs 1010. Two secondary ribs 1010 are respectively located on both sides of a primary rib 1000 and are joined on one side to the faces 1000*f* of the primary rib 1000, so as to separate each face 1000*f* of the primary rib into two face portions 1000*f*1, 1000*f*2, each secondary rib 1010 forming an angle equal to 45° with the primary rib 1000 to which it is joined. Note that the second peripheral geometric shape 16' of the surface projected along the axis E (not shown because orthogonal) of the central structure is a polygon.

The invention claimed is:

1. An internal reinforcement element for a plastic tank for a motor vehicle, said internal reinforcement element comprising:
a central structure comprising
a first system of ribs, called a primary system of ribs, comprising at least three primary ribs joined to one another, each primary rib being joined to the other primary ribs by a single side, the central structure having a joint of the at least three primary ribs at its center, said joint and said primary ribs extending along an axis,
a second system of ribs, referred to as a secondary system of ribs, comprising at least two secondary ribs, said at least two secondary ribs being located on both sides of a primary rib and being joined on one side to the primary rib, said at least two secondary ribs extending along an axis parallel to the axis, each secondary rib forming an angle greater than 0° with the primary rib to which it is joined,
the sides of the primary ribs opposite the joint-forming sides and the sides of the secondary ribs opposite the sides joined to the primary rib defining a projected surface of the central structure having a first peripheral geometric shape along the axis,
a first end and a second end located on both sides of the central structure, each comprising the first system of ribs and the second system of ribs, the first end and the second end comprising a weld region configured to be welded to the plastic tank, the first end and the second end having a second peripheral geometric shape forming a transition between the first peripheral geometric shape and a third peripheral geometric shape of the weld region, the second geometric shape and the third geometric shape corresponding to the respective geometric shapes of the surfaces projected along the axis,
wherein the at least two secondary ribs are joined to the faces of the primary rib so as to separate each face of the primary rib into two face portions.

2. The internal reinforcement element for a motor vehicle plastic tank according to claim 1, wherein the first system of ribs, called the primary system of ribs, comprises at least four primary ribs joined to one another, each primary rib being joined to the other primary ribs by only one side.

3. The internal reinforcement element for a motor vehicle plastic tank according to claim 1, wherein at the angle formed by two adjacent primary ribs of the first primary system of ribs is identical for all adjacent primary ribs.

4. The internal reinforcement element for a motor vehicle plastic tank according to claim 1, wherein the primary rib constitutes a plane of symmetry for the at least two secondary ribs adjoining the primary rib and located on both sides of said primary rib.

5. The internal reinforcement element for a motor vehicle plastic tank according to claim 1, wherein at least one primary rib of the first primary system of ribs comprises a side opposite the joint in the form of a two-pronged fork.

6. The internal reinforcement element for a motor vehicle plastic tank according to claim 1, wherein the first peripheral geometric shape of the surface projected along the axis of the central structure is a polygon.

7. The internal reinforcement element for a motor vehicle plastic tank according to claim 6, wherein the polygon is a regular polygon.

8. The internal reinforcement element for a motor vehicle plastic tank according to claim 1, wherein the third peripheral geometric shape of the surface projected along the axis of a weld region is a circle.

9. The internal reinforcement element for a motor vehicle plastic tank according to claim 1, further comprising gripping means in the form of a clipping region configured to be attached to a support or in the form of gripping ribs.

10. The internal reinforcement element for a motor vehicle plastic tank according to claim 1, wherein the angle formed by two adjacent primary ribs is approximately equal to 90°.

11. The internal reinforcement element for a motor vehicle plastic tank according to claim 1, wherein the angle formed by a primary rib and a secondary rib is approximately equal to 45°.

12. The internal reinforcement element for a motor vehicle plastic tank according to claim 1, wherein the central structure, the first end and the second end constitute a one-piece assembly.

13. The internal reinforcement element for a motor vehicle plastic tank according to claim 1, wherein it is based on a material selected from polyoxymethylene (POM), poly-phenylene sulfide (PPS), polyphthalimide (PPA), polyetheretherketone (PEEK), polyamide-imide (PAI), polyaryletherketone (PAEK), polyamide (PA), polyketone (PK) and polyethylene (PE), preferentially polyethylene (PE), more preferentially high-density polyethylene (HDPE).

14. The internal reinforcement element for a motor vehicle plastic tank according to claim 1, wherein the axis is a central axis of symmetry of the first system of ribs, called the primary system of ribs, of said internal reinforcement element.

15. A plastic tank for a motor vehicle comprising an internal reinforcement element according to claim 1.

16. A method for manufacturing a plastic tank for a vehicle tank, comprising:

extruding a parison, inserting an internal reinforcement element according to claim 1 into the parison before or after blow-molding; and welding the internal reinforcement element to a wall of the vehicle tank.

\* \* \* \* \*